Patented Mar. 20, 1923.                                         1,449,157

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

ENAMELING COMPOSITION.

No Drawing.        Application filed April 14, 1922.  Serial No. 552,634.

*To all whom it may concern:*

Be it known that I, HERMAN F. WILLKIE, a citizen of the United States, a resident of Baltimore, in the State of Maryland, have invented certain new and useful Improvements in Enameling Compositions, of which the following is a specification.

My invention relates to a composition designed for producing enameled surfaces and having the many advantages hereinafter referred to.

The object of my invention is especially to provide a composition with which an enameled surface may be produced by the application of a single coat, if desired, thus saving the labor and cost that is incident to the application of the customary second coating. The enamel coating obtained by the use of my composition, although applied as a single coating, is comprised of a lower layer of a dense opaque character and an upper varnish-like layer which gives the coated surface a high gloss.

In carrying out my invention I provide a composition which contains, in addition to a cellulose ester, such, for example, as pyroxylin, a very high boiling solvent, that is to say boiling above 150° C., so as to remain at least in part in the hardened film as a latent solvent of the cellulose ester contained in the upper layer of the coating and so as to cement together the particles of precipitated cellulose ester which are formed in the lower layer of said coating. The preferred very high boiling solvent which I use for this purpose is diethyl phthalate. With the very high boiling solvent in the composition I use, also, a volatile solvent which will give the desired fluidity and which forms with the water present in the composition, either in the cellulose ester or which is abstracted from the air during the drying, constant boiling mixtures. These will readily escape from the upper layer of the film so as to leave in this portion of the coating a clear varnish-like layer, which will set before such constant boiling mixtures have had an opportunity to completely carry off the water from the lower layer of the coating, thus causing the water remaining in the lower layer of the coating to precipitate out particles of the cellulose ester to form a dense opaque mass.

It is to be understood that my invention may be embodied in many different forms, but, by way of example, I may make a coating composition in accordance with my invention in the following way:

10 gr. of pyroxylin are dissolved in 100 cc. of a solvent mixture comprising 23¾% by volume of anhydrous ethyl acetate, 75% by volume of ethyl alcohol having a strength of approximately 90%, containing 10% of water, and 1¼% of diethyl phthalate.

If other strengths of alcohol are to be used, an amount of water may be added therewith so as to obtain the desired percentages of alcohol and water in the composition, or, if desired, the water present in the other constituents as an impurity may be relied upon to act in the same way. Furthermore, the percentages of the various constituents in the composition may be varied to a considerable extent. For example, the diethyl phthalate may be varied from ¾ of 1% to 2½% of the solvent mixture, but if such variation takes place, preferably the amount of pyroxylin is increased or decreased in accordance with the increase or decrease of the diethyl phthalate. Furthermore, wide variations may be made in the percentages of ethyl acetate and ethyl alcohol present but preferably any increase in one of these two constituents should be accompanied by a proportionate increase in the other one of said constituents. In other words, the ratio of the ethyl acetate and ethyl alcohol combined to the diethyl phthalate and proxylin may change, to a considerable extent, to obtain the desired fluidity but the ratios of the ethyl acetate to the ethyl alcohol and the diethyl phthalate to the pyroxylin should preferably remain the same.

The composition made in this way is a clear solution but when it is applied to a surface, constant boiling mixtures of the solvent constituents, and including proportions of the water present, will evaporate and finally leave in the upper layer of the coating merely the pyroxylin dissolved in the diethyl phthalate which, acting as a latent solvent, will harden with the gelatinized pyroxylin so as to form a transparent glossy upper surface in the resulting film. The hardening of the upper layer of the film in this manner, however, probably tends to prevent all of the water from escaping from the lower layer thereof and this will result in the precipitation of particles of the pyroxylin which become cemented together by the gelatinized pyroxylin in which the said particles are embedded. In any case, however, the conditions are such that in the evaporation of the volatile portion of the solvent mixture there is left behind an insufficient proportion of the high boiling solvent to completely gelatinize a portion of the pyroxylin contained in the lower layer of the film. These particles of precipitated pyroxylin thus form a dense opaque mass having the effect of a flat white layer beneath the glossy transparent upper layer of the film.

It will be understood that many other constituents of any desired character may be added to the composition. For example, if desired, any dyestuff, such as, for example, a spirit or oil soluble aniline dye may be added to give the resulting film the desired color and pigments may also be added. Also, the constituents of the above composition may be substituted by other constituents of a similar character but giving the same or a similar result. For example, instead of pyroxylin I may use some other cellulose ester, as, for example, cellulose acetate. Instead of the diethyl phthalate I may use ethyl aceto acetate, triacetin, ethyl succinate or dimethyl phthalate, etc. Furthermore, instead of the ethyl acetate and ethyl alcohol I may use acetone and water, or instead ether, alcohol and water, or in said above mentioned composition, instead of the ethyl acetate I may substitute methyl acetate or acetone. Resins may also be added to increase hardness and impart other special properties of the various resins. The percentages of water may be varied inversely to the atmospheric humidity to get very advantageous results.

Various other changes may be made in my invention without departing from the spirit thereof and within the scope of the appended claims.

I claim:

1. A composition containing a cellulose ester, a volatile solvent and a quantity of a very high boiling solvent sufficient to gelatinize only a portion of the cellulose ester when the volatile constituents have evaporated.

2. A composition containing pyroxylin, a volatile solvent and a quantity of a very high boiling solvent sufficient to gelatinize only a portion of the pyroxylin when the volatile constituents have evaporated.

3. A composition containing a cellulose ester, a volatile solvent and a quantity of a very high boiling solvent sufficient to gelatinize only a portion of the cellulose ester in the lower layer of a film formed therefrom when the volatile constituents have evaporated.

4. A composition containing pyroxylin, a volatile solvent and a quantity of a very high boiling solvent sufficient to gelatinize only a portion of the pyroxylin in the lower layer of a film formed therefrom when the volatile constituents have evaporated.

5. A composition containing a cellulose ester, a volatile solvent and a quantity of diethyl phthalate sufficient to gelatinize only a portion of the cellulose ester when the volatile constituents have evaporated.

6. A composition containing pyroxylin, a volatile solvent and a quantity of diethyl phthalate sufficient to gelatinize only a portion of the pyroxylin when the volatile constituents have evaporated.

7. A composition containing a cellulose ester, a volatile solvent and a quantity of diethyl phthalate sufficient to gelatinize only a portion of the cellulose ester in the lower layer of a film formed therefrom when the volatile constituents have evaporated.

8. A composition containing pyroxylin, a volatile solvent and a quantity of diethyl phthalate sufficient to gelatinize only a portion of the pyroxylin in the lower layer of a film formed therefrom when the volatile constituents have evaporated.

9. A composition containing a cellulose ester, ethyl acetate and alcohol containing water, and a quantity of a very high boiling solvent sufficient to gelatinize only a portion of the cellulose ester when the volatile constituents have evaporated.

10. A composition containing pyroxylin, ethyl acetate and alcohol containing water, and a quantity of a very high boiling solvent sufficient to gelatinize only a portion of the pyroxylin when the volatile constituents have evaporated.

11. A composition containing a cellulose ester, ethyl acetate and alcohol containing water, and a quantity of a very high boiling solvent sufficient to gelatinize only a portion of the cellulose ester in the lower layer of a film formed therefrom when the volatile constituents have evaporated.

12. A composition containing pyroxylin, ethyl acetate and alcohol containing water, and a quantity of a very high boiling solvent sufficient to gelatinize only a portion of the pyroxylin in the lower layer of a film formed therefrom when the volatile constituents have evaporated.

13. A composition containing a cellulose ester, ethyl acetate and alcohol containing water, and a quantity of diethyl phthalate sufficient to gelatinize only a portion of the cellulose ester when the volatile constituents have evaporated.

14. A composition containing pyroxlin, ethyl acetate and alcohol containing water, and a quantity of diethyl phthalate sufficient to gelatinize only a portion of the pyroxylin when the volatile constituents have evaporated.

15. A composition containing a cellulose ester, ethyl acetate and alcohol containing water, and a quantity of diethyl phthalate sufficient to gelatinize only a portion of the cellulose ester in the lower layer of a film formed therefrom when the volatile constituents have evaporated.

16. A composition containing pyroxylin, ethyl acetate and alcohol containing water, and a quantity of diethyl phthalate sufficient to gelatinize only a portion of the pyroxylin in the lower layer of a film formed therefrom when the volatile constituents have evaporated.

17. An article of manufacture comprising a film which comprises a dense opaque lower layer of undissolved cellulose ester particles cemented together with gelatinized cellulose ester, and an upper layer in which the cellulose ester present is gelatinized.

18. An article of manufacture comprising a film which comprises a dense opaque lower layer of undissolved cellulose ester particles cemented together with gelatinized cellulose ester, and an upper layer in which the cellulose ester present is gelatinized, the gelatinized cellulose ester in said film containing a very high boiling solvent which acts as a latent solvent for the cellulose ester.

In testimony that I claim the foregoing, I have hereunto set my hand this 14th day of March, 1922.

HERMAN F. WILLKIE.